Sept. 27, 1960   E. B. BRUMMER   2,954,324
EPILATING COMPOSITION AND DEVICE
Filed May 13, 1957
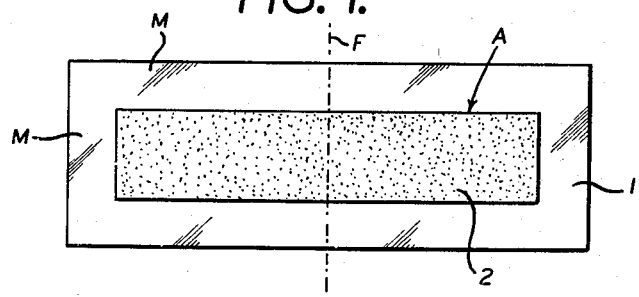
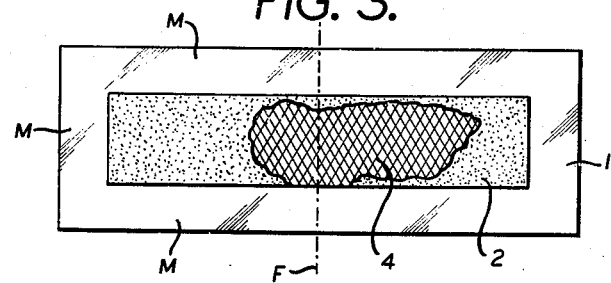
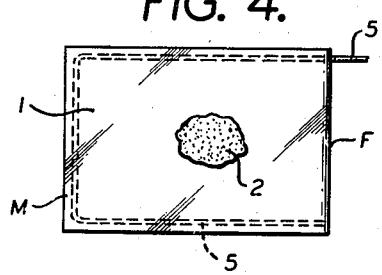
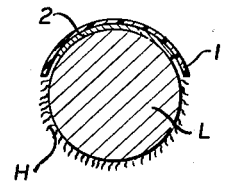
INVENTOR
ELLA BACHE BRUMMER
BY
ATTORNEYS.

United States Patent Office 2,954,324
Patented Sept. 27, 1960

2,954,324
EPILATING COMPOSITION AND DEVICE

Ella Bache Brummer, 24 E. 55th St., New York 22, N.Y.

Filed May 13, 1957, Ser. No. 658,772

5 Claims. (Cl. 167—89)

This invention relates to a new and improved epilating composition, a method of making the same and to a depilatory pad for applying said composition to the skin.

According to my invention, I provide an improved epilatory composition which can be applied without heating to the human skin. When this composition is removed from the skin, it removes the hair mechanically, without the use of any chemically acting depilatory agents, such as sulfhydrates and the like.

It has been previously proposed to provide epilating compositions for removing hair from the human skin mechanically, but these known compositions had various disadvantages. Thus, it was necessary to heat these prior compositions before applying them to the human skin. Moreover, some of these compositions adhere not only to the hair, but also to the skin, or have an irritating effect on the skin, or are unstable on storage.

I have now found that the beforementioned essential disadvantages of the prior art compositions can be safely eliminated and a composition, which is satisfactory in every respect, can be obtained from the following ingredients, by the procedure described hereinafter.

According to my invention, I produce a spreadable composition of the consistency of a paste, which can be packed, if desired, in collapsible tubes, from which the composition can be extruded for immediate use without any additional treatment. The paste is extrudable at ordinary room temperature of 20°–25° C.

The improved epilating composition embodying my present invention consists of sucrose, a weak acid, a water-insoluble waxy or resinous substance and water, which are combined with the addition of a homogenizer to form a stable, homogeneous, extrudable paste-like product.

As a weak acid, I can use citric acid, tartaric acid or tannic acid, in more or less pure condition, or in the form of concentrates, e.g., citrus fruit juice. As examples of the waxy or resinous substance, beeswax, cacao butter, lanolin and petrolatum or their mixtures are mentioned.

In carrying out my invention, for example, 7–10 grams of citric acid are dissolved in 900 grams of distilled water, whereupon in the resulting solution, about 450 grams of sucrose are dissolved. By heating the solution, thus formed, to about 110° C. for about 120 minutes, a yellowish thick syrup is formed. Into this syrup a molten mixture of 37–45 grams of beeswax with 3 grams of sorbitan monopalmitate is introduced, whereby the temperature is maintained at 110°–115° C.

The resulting composition is introduced into a mixer, treated in the mixer at 80°–110° C. until it is homogeneous, cooled to 40°–50° C. and is then filled in tubes or jars.

In the above example, the citric acid can be partly or entirely substituted by an equal amount by weight of tartaric acid or tannic acid. Furthermore, in the molten mixture of 37–45 grams of beeswax and 3 grams of sorbitan monopalmitate, 4.0–4.5 grams of rosin can be incorporated.

The composition thus obtained adheres only to the hair and not to the skin; it takes the hair out with the bulb, does not leave a sticky, syrupy surface on the skin, does not harden or pull the skin and has no irritating effect on the skin. The composition is stable, has the consistency of a creamy paste, is not sensitive to changes of temperature or humidity, does not harden and does not separate into its ingredients on storage.

In order to obtain this composition, it is indispensable to use the above described ingredients and proportions and to combine the above described ingredients under the conditions and by the procedure described above, because a homogeneous, stable product having the above described characteristics and effects is formed only if all prescribed steps, conditions and proportions are observed. The above examples illustrate some specific embodiments and best modes of carrying out my invention.

I have further found that the epilating compositions embodying my invention can be used with advantage and conveniently applied to the human skin in the form of epilating pads which essentially consist of a film-like base to which the epilating composition is applied in the form of a thin, substantially uniform layer provided on one surface of the base. For purposes of storage the epilating pad is folded about a middle portion thereof so that the layers of epilating composition face each other and are in contact with each other when the pad is in folded condition. If it is intended to use the pad for the removal of hair from human skin, the pad is unfolded and the layer of epilating composition is brought in contact with the skin by placing the pad on and pressing it against the skin. After a short period of time, e.g. 1–2 minutes, the pad is ripped off quickly from the skin. After folding it again and then unfolding it, it can be used again for the removal of hair and this can be repeated several times.

The appended drawings illustrate by way of example and without limitation some embodiments of and best modes of carrying out the invention.

In the appended drawings

Figure 1 illustrates in top view an epilating pad according to my invention in unfolded condition;

Figure 2 is a sectional view along line F in Figure 1, of a somewhat modified embodiment;

Figure 3 is the top view of a modification of the pad shown in Figure 1, in which the layer of epilating composition is partly broken away;

Figure 4 illustrates the epilating pad in folded condition; and

Figure 5 illustrates application of the unfolded pad to the skin.

Referring now to the drawings in detail, in Figure 1 reference numeral 1 denotes a carrier base which may consist, for example, of a film of polyethylene, or of chlorinated rubber (for example chlorinated rubber sold under the trademark "Pliofilm" and consisting of rubber hydrochloride) of other plastic materials, or of a suitable impervious textile fabric. To this base the depilatory composition 2 is applied in a substantially uniform layer spread over a limited area A, so that marginal strips M are formed which are free from the epilatory composition. The base thus provided with an epilatory layer is then folded about a middle line F, as shown in Fig. 4, and is stored and sold in this folded condition for use. Before use, the folded pad is unfolded by gripping the oppositely located marginal strips M (see Fig. 4) and pulling the two halves of the pad apart to the condition shown in Fig. 1. The pad can now be applied to the skin surface to be treated, as shown in Fig. 5, then removed from the skin, folded and unfolded again and then used again for the removal of hair, these steps being carried out in the manner described above. I have found that the step of folding the pad is necessary before using it again for the removal of hair.

In the modification shown in Fig. 2, the film base is provided with a folding groove shown at 3.

According to another modification the base 1 is provided with depressions 4 provided by casting the film on a suitably shaped base, or by embossing the film. Such depressions and the areas between the depressions contain and carry the epilating composition.

In the modification illustrated in Fig. 4, the marginal edges of the base area are heat-sealed and include a conventional pull string 5 for opening the folded pad.

I have unexpectedly found that the use of sorbitan monopalmitate according to my invention, in combination with the other ingredients of the composition, has not only the beneficial effect of preventing undesired changes of the composition, such as particularly hardening at lower temperatures and separation of individual ingredients at increased temperatures, e.g. in summer, but also essentially contributes to obtaining substantially painless removal of hair, by preventing or reducing adherence of the epilatory composition to the skin proper.

It will be understood from the above that my invention is not limited to the details specifically described above and illustrated in the drawings and can be carried out with various modifications. For example, the carrier for the epilatory composition can be made of flexible materials other than those mentioned above and the marginal portions of the base may be heat-sealed or not or may be omitted. If the edges of the pad are heat-sealed, the heat-sealed portions can be cut of in order to open the pad. The size and form of the pads may vary depending on the part of the body to which the pad is supposed to be applied. The spreading of the epilatory composition can be effected in any suitable manner, e.g. by means and/or methods commonly used for coating fabrics or the like.

A particular advantage of my invention consists in that after application to and removal from the skin, the epilatory pad can be rendered suitable for repeated use by folding it in the above described manner, pressing the epilatory layers located opposite to each other, well together and then unfolding the pad for further use. By this procedure, the stickiness of the epilatory composition is regenerated so that the pad can be used for epilation repeatedly, e.g. 3–6 times, or more, which is a considerable economic advantage.

The parts stated above are parts by weight.

Reference is made to my co-pending application filed under Serial No. 573,626 on March 26, 1956, now abandoned, of which this is a continuation-in-part.

What is claimed is:

1. An epilating composition consisting of a substantially homogeneous reaction product of about 7–10 parts by weight of weak acid selected from the group consisting of citric acid, tartaric acid and tannic acid, about 450 parts by weight of sucrose, about 37–45 parts by weight of beeswax and about 3 parts by weight of sorbitan monopalmitate, said composition being stable on storage, adhering to the hair, but not adhering to the skin, leaving no syrupy surface when applied, and subsequently removed from the skin, and having no irritating effect on the skin; the sorbitan monopalmitate stabilizing the composition against hardening during storage; said composition being applicable to the skin, for mechanical removal of the hair therefrom, in the cold condition.

2. A composition as claimed in claim 1, in which the ingredients include 4.0–4.5 parts by weight of rosin.

3. A process for preparing an epilating composition, comprising in succession the steps of dissolving 7–10 parts by weight of a weak acid selected from the group consisting of citric acid, tartaric acid and tannic acid, and 450 parts by weight of sucrose, in 900 parts by weight of water under heating to 70°–100° C., heating the solution to about 110° C. for about 120 minutes; introducing into the resulting solution a molten mixture of 37–45 parts by weight of beeswax and 3 parts by weight of sorbitan monopalmitate while maintaining the temperature at 110°–115° C., and mixing the resulting product to a homogeneous composition; the sorbitan monopalmitate acting as a stabilizer to prevent hardening of the composition during storage.

4. A modification of the process claimed in claim 3, in which 4.0–4.5 parts by weight of rosin are incorporated in the molten mixture of 37–45 parts of beeswax and 3 parts of sorbitan monopalmitate.

5. In an epilatory pad of the type comprising a carrier strip provided with epilatory composition applied to said strip, the combination of said strip with a composition consisting of a substantially homogeneous mixture of about 7–10 parts by weight of weak acid selected from the group consisting of citric acid, tartaric acid and tannic acid, about 450 parts by weight of sucrose, about 37–45 parts by weight of beeswax and about 3 parts by weight of sorbitan monopalmitate, the epilating composition being sealed by folding it about a middle line to a condition in which the epilating layers of the folded halves are in contact with each other; the sorbitan monopalmitate stabilizing the composition against hardening during storage; the pad being applicable to the skin, for mechanical removal of hair therefrom, in the cold condition.

References Cited in the file of this patent

UNITED STATES PATENTS

| Re. 20,594 | Anthony | Dec. 14, 1937 |
| 166,090 | Garton | July 27, 1875 |
| 498,000 | Wohl | May 23, 1893 |
| 1,181,086 | Taussig | Apr. 25, 1916 |
| 1,532,271 | Slay | Apr. 7, 1925 |
| 2,091,313 | Grant | Aug. 31, 1937 |
| 2,128,158 | Moore | Aug. 23, 1938 |
| 2,377,774 | Gotham | June 5, 1945 |
| 2,417,882 | Neary | Mar. 25, 1947 |
| 2,425,696 | Herrmann et al. | Aug. 12, 1947 |

FOREIGN PATENTS

| 201,442 | Switzerland | May 1, 1939 |
| 315,409 | Italy | Feb. 24, 1934 |
| 478,176 | Great Britain | Jan. 13, 1938 |

OTHER REFERENCES

Atlas: "Spans and Tweens," Atlas Powder Co., Wilmington, Del., November 1942 (17 p. brochure).